US006276838B1

United States Patent
Lauk et al.

(10) Patent No.: US 6,276,838 B1
(45) Date of Patent: Aug. 21, 2001

(54) SHAFT-HUB ASSEMBLY AND METHOD OF PRODUCTION THEREOF

(75) Inventors: Detlef Lauk, Renchen; Lothar Fauth, Buehl; Ernst Fischer, Gernsbach; Hansjoerg Karcher, Buehlertal; Juergen Herp; Erik Maurer, both of Buehl; Richard Hurst, Offenburg; Anton Waibel, Hagnau; Andreas Wiegert, Kappelrodeck, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,659

(22) PCT Filed: Aug. 4, 1998

(86) PCT No.: PCT/DE98/02222

§ 371 Date: Oct. 1, 1999

§ 102(e) Date: Oct. 1, 1999

(87) PCT Pub. No.: WO99/30049

PCT Pub. Date: Jun. 17, 1999

(30) Foreign Application Priority Data

Dec. 11, 1997 (DE) .............................................. 197 55 091

(51) Int. Cl.⁷ .......................... F16C 43/04; B21D 39/00
(52) U.S. Cl. .............................. 384/537; 29/505; 72/124; 403/279
(58) Field of Search ................................... 384/537, 584, 384/585; 29/505, 509, 283.5; 72/124, 125, 126; 403/279, 281, 274

(56) References Cited

U.S. PATENT DOCUMENTS

| | | | |
|---|---|---|---|
| 4,438,555 | * 3/1984 | Tsumuki et al. | 29/505 |
| 4,462,148 | * 7/1984 | Joyce | 29/447 |
| 4,574,448 | * 3/1986 | Brandenstein et al. | 29/283.5 |
| 4,640,632 | * 2/1987 | Brandenstein et al. | 384/537 |
| 4,722,619 | * 2/1988 | Reiser et al. | 384/585 |
| 4,848,938 | * 7/1989 | Haas et al. | 384/537 |
| 5,061,090 | * 10/1991 | Kriaski et al. | 384/537 |

FOREIGN PATENT DOCUMENTS

| 491362 | * 1/1930 | (DE) . |
|---|---|---|
| 2549547 | * 1/1985 | (FR) . |
| 2630790 | * 11/1989 | (FR) . |
| 2730538 | * 8/1996 | (FR) . |

\* cited by examiner

Primary Examiner—Thomas R. Hannon
(74) Attorney, Agent, or Firm—Michael J. Striker

(57) ABSTRACT

The invention relates to a shaft and hub connection for securing bearings, in particular ball bearings (12), on a shaft (10). The proposal is made that the hub part (14) of the bearing (12) encompassing the shaft (10) have at least one axial surface (20), against which a projection (24, 30) rests, which is produced from the shaft (10) by means of plastic deformation and prevents an axial movement.

7 Claims, 1 Drawing Sheet

SHAFT-HUB ASSEMBLY AND METHOD OF PRODUCTION THEREOF

BACKGROUND OF THE INVENTION

The invention relates to a shaft and hub connection as well as a process for producing such a connection. In a known shaft and hub connection, in order to prevent axial displacements, the bearing is supported as a rule against an axial stop. The axial stop can be embodied as a step on the shaft, but this requires a shaft with an enlarged diameter in relation to the hub internal diameter. Securing rings for axial support are also known, which are held in a recess in the shaft. To this end is necessary to provide the shaft with a narrow-tolerance recess and during assembly, to slide the split ring on and anchor it in the recess before the bearing is mounted. This type of retention is expensive and costly to assemble.

SUMMARY OF THE INVENTION

The shaft and hub connection according to the invention for securing bearings, has the advantage that after the bearing is slid on, a positive and frictional, non-positive retention can be affixed in a single step. It is not necessary that the shaft be oversized in certain regions in the bearing. The projection produced by the plastic deformation can be embodied so that on the one hand, it has an axial surface component that rests against an axial surface of the bearing hub. On the other hand, the deformation produces a slight diameter increase in the vicinity beneath the hub so that the fixing is also reinforced in the circumference direction. The otherwise required press fit of the bearing hub on the shaft is thus produced simultaneously with the axial retention. The otherwise conventional preparations, such as a roughening of the shaft in the vicinity of the bearing seat or a reduction of the shaft diameter in front of the bearing seat, can be eliminated. Since the projection from the material of the shaft rests directly against the outside of the bearing, a play-free fastening and retention are achieved without having to comply with narrow tolerances for this purpose.

In order to keep the stress on the bearing low, it is advantageous if the projection only extends over a part of the circumference of the shaft. In the event of considerable axial pressure on the bearing, the projection is preferably produced over the entire circumference of the shaft.

If the projection is produced by rolling, then in rests in a precisely shaped manner against the axial surface of the hub part. Furthermore, the stress concentrations that occur to an increased degree in such narrowed regions are optimally counteracted by the rounded shape used in the rolling.

A very reasonably priced production of the projections is achieved by means of caulking, wherein the caulking tool is pressed into the surface of the shaft in the region in front of the axial surface and is moved toward the axial surface. This raises projections which can be produced in very short cycle times. This process is therefore particularly suited for mass-produced articles.

The process according to the invention for producing a shaft and hub connection, with the features of the collateral claim permits a very reasonably priced, easy-to-assemble manufacture.

BRIEF DESCRIPTION OF THE DRAWINGS

Two exemplary embodiments of the shaft and hub connection according to the invention are shown in the drawings and will be explained in detail in the subsequent description.

DESCRIPTION OF THE PREFERRED EMBODIMENTS

Figure 1:
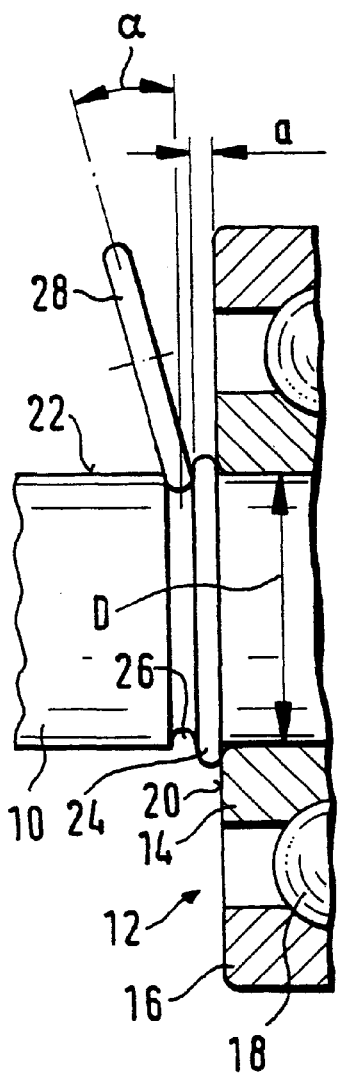
FIG. 1 shows a sectional view of a first exemplary embodiment.

FIG. 1 shows a shaft 10 which supports a ball bearing 12. The ball bearing 12 has a hub part 14, an external ring 16, and a number of balls 18. The balls 20 can be secured by means of a cage (not shown).

In the vicinity of an axial surface 20 of the hub part 14, a projection 24 is formed out of the shaft surface 22. On the side of the projection 24 opposite from the axial surface 20, a recess 26 is let into the shaft surface 22. The recess 24, which has been produced by means of plastic deformation of the shaft surface 22, directly adjoins the axial surface 20.

The projection 24 has the shape of an annular bead, which has been produced by means of a rolling tool 28 by pressing the material out from the recess 26. The projection 24 extends over the entire circumference of the shaft and thus permits a uniform support even under high stress.

In the exemplary embodiment, the rolling tool 28 is guided at an angle α in relation to the axial surface 20 and at a distance a, which corresponds to the thickness of the projection. An angle α in the range from 0° to 45°, in particular of 15° has proven favorable for an optimal production of the projection. However it is also possible after the radial compression and rolling, to press the tool in the direction of the axial surface 20 so that the collar produced rests against this axial surface 20 without a gap. The distance a advantageously lies in the range from 0.5 mm to 1.5 mm, particularly 1 mm.

Figure 2:
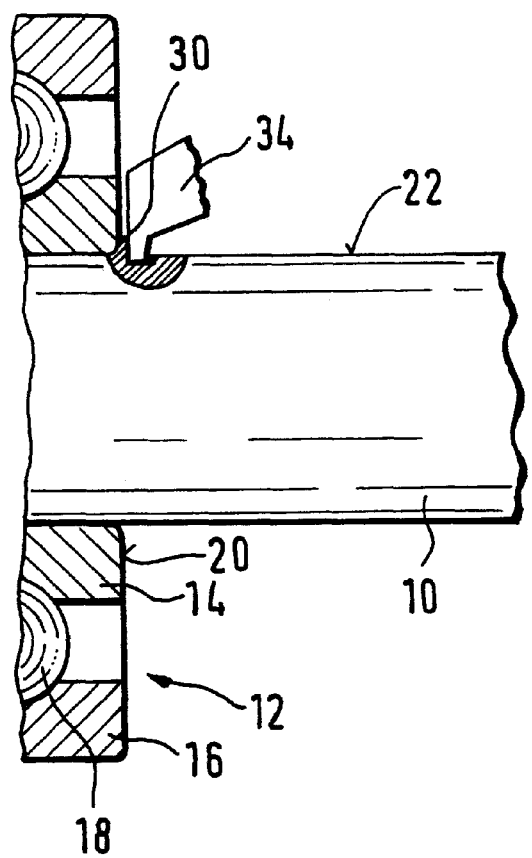
FIG. 2 shows a sectional view of a second exemplary embodiment.

FIG. 2 shows a second exemplary embodiment in which the same parts are provided with the same reference numerals of the first exemplary embodiment. In the vicinity of the axial surface 20 there, a projection 30 is formed by way of the shaft surface 22. On the side of the projection 30 opposite from the axial surface 20, a recess is let into the shaft surface 22. The projection 30 is thus raised during the production of the recess by means of pressing a caulking tool 34 into the shaft surface 22. The projection 30 rests against the axial surface 20 in a frictional, non-positive manner and in a positive manner during this procedure.

By means of the plastic deformation of the shaft 10 in the region next to the hub part 14, in both exemplary embodiments, the material of the shaft 10 is also expanded inside the hub part internal diameter D at least in the vicinity of the axial surface 14. As a result, an additional press fit is produced in this vicinity, which counteracts a rotation of the hub part 14 on the shaft 10.

In a preferable process for producing a shaft and hub connection with a retention, the ball bearing 12 is slid onto the shaft 10 and fixed in the vicinity to be fastened. Then, the projection 24 or 30 is formed with a rolling tool 28 or a caulking tool 34 so that through plastic deformation, the material rests as a projection against the axial surface 20 of the hub part 14.

Is not necessary that the projection 24 produced by means of rolling extend over the entire circumference of the shaft 12. On the other hand, with a corresponding embodiment of the caulking tool 34, it can also produce a complete annular bead.

What is claimed is:

1. A process for producing a shaft and hub connection for securing ball bearings on a shaft whereby after mounting of the ball bearing onto the shaft, a projection is produced by means of a plastic deformation of the shaft surface by means of rolling an annular groove immediately in front of the projection whereby a rolling tool is guided at an angle of more than it, 0 degree to 45 degree, in relation to the perpendicular of the shaft, so that the projection rests against an axial surface of the ball bearing hub and prevents an axial movement.

2. A process as defined in claim 1, wherein the rolling tool is guided at an angle of 15 degree.

3. A process as defined in claim 1, wherein the rolling tool is guided in relation to the axial surface at a distance which lies in the range from 0.5 mm to 1.5 mm.

4. A process as defined in claim 3, wherein the rolling tool is guided in relation to the axial surface at a distance which is equal to 1 mm.

5. A process for producing a shaft and hub connection for securing ball bearings on a shaft whereby after the mounting of the ball bearing onto the shaft, a projection is produced by means of a plastic, deformation of the shaft surface in a radial direction by a rolling tool, which is further pressed in the direction of the axial surface of the hub so that a collar is produced which rests against this axial surface without a gap.

6. A process as defined in claim 5, wherein the rolling tool is guided in relation to the axial surface at a distance which lies in the range from 0.5 mm to 1.5 mm.

7. A process as defined in claim 6, wherein the rolling tool is guided in relation to the axial surface at a distance which is equal to 1 mm.

* * * * *